(12) United States Patent
Kershaw et al.

(10) Patent No.: US 7,529,916 B2
(45) Date of Patent: May 5, 2009

(54) DATA PROCESSING APPARATUS AND METHOD FOR CONTROLLING ACCESS TO REGISTERS

(75) Inventors: Daniel Kershaw, Cambridge (GB); James Ian McNiven, Ely (GB); Daniel Luke Kefford, London (GB); David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 255 days.

(21) Appl. No.: 11/504,780

(22) Filed: Aug. 16, 2006

(65) Prior Publication Data

US 2008/0046701 A1 Feb. 21, 2008

(51) Int. Cl.
*G06F 9/00* (2006.01)
(52) U.S. Cl. .......................... 712/229; 712/43; 712/228
(58) Field of Classification Search .................... 712/43, 712/228, 229; 713/190
See application file for complete search history.

(56) References Cited

U.S. PATENT DOCUMENTS

| | | | | |
|---|---|---|---|---|
| 6,006,321 A * | 12/1999 | Abbott | ........................ | 712/43 |
| 6,121,791 A * | 9/2000 | Abbott | ........................ | 326/39 |
| 6,150,836 A * | 11/2000 | Abbott | ........................ | 326/38 |
| 6,272,520 B1 * | 8/2001 | Sharangpani et al. | ........ | 718/108 |
| 6,351,142 B1 * | 2/2002 | Abbott | ........................ | 326/39 |
| 6,408,325 B1 * | 6/2002 | Shaylor | ........................ | 718/108 |
| 6,531,888 B2 * | 3/2003 | Abbott | ........................ | 326/38 |
| 6,578,137 B2 * | 6/2003 | Parady | ........................ | 712/228 |
| 7,185,159 B2 * | 2/2007 | Beinet et al. | ................ | 711/163 |
| 7,305,534 B2 * | 12/2007 | Watt et al. | .................... | 711/163 |
| 2004/0153672 A1 * | 8/2004 | Watt et al. | .................... | 713/201 |
| 2004/0170046 A1 * | 9/2004 | Belnet et al. | ................ | 365/145 |
| 2004/0177261 A1 * | 9/2004 | Watt et al. | .................... | 713/193 |
| 2005/0138257 A1 * | 6/2005 | Burdass et al. | .............. | 710/262 |
| 2005/0144438 A1 * | 6/2005 | Hashimoto et al. | .......... | 713/155 |
| 2006/0010308 A1 * | 1/2006 | Haruki et al. | ................ | 712/228 |

OTHER PUBLICATIONS

U.S. Appl. No. 10/714,561, filed Nov. 17, 2003.

* cited by examiner

*Primary Examiner*—Aimee J Li
(74) *Attorney, Agent, or Firm*—Nixon & Vanderhye P.C.

(57) ABSTRACT

A data processing apparatus and method are provided for controlling access to registers. The data processing apparatus comprises a processing unit for performing data processing operations on data values, the processing unit having a plurality of modes of operation. A plurality of registers are provided for storing data values for access by the processing unit, with a subset of those registers being mode specific registers. Each mode specific register is used by the processing unit when operating in an associated mode of operation. The processing unit is switchable between a plurality of contexts, the data values stored in the plurality of registers being dependent on a current context of the processing unit. The processing unit performs a switch operation to switch from the current context to a new context, during which the data values in the registers are updated having regard to the new context. A control register is provided which, for at least one mode of operation having at least one mode specific register associated therewith, has an access field which is programmable by the processing unit when operating in a predetermined mode of operation. When the access field is set, the processing unit is selectively denied access to the associated at least one mode specific register, whereby updating of the data values in the associated at least one mode specific register is avoided during the switch operation. This significantly increases the speed of the switch operation.

14 Claims, 12 Drawing Sheets

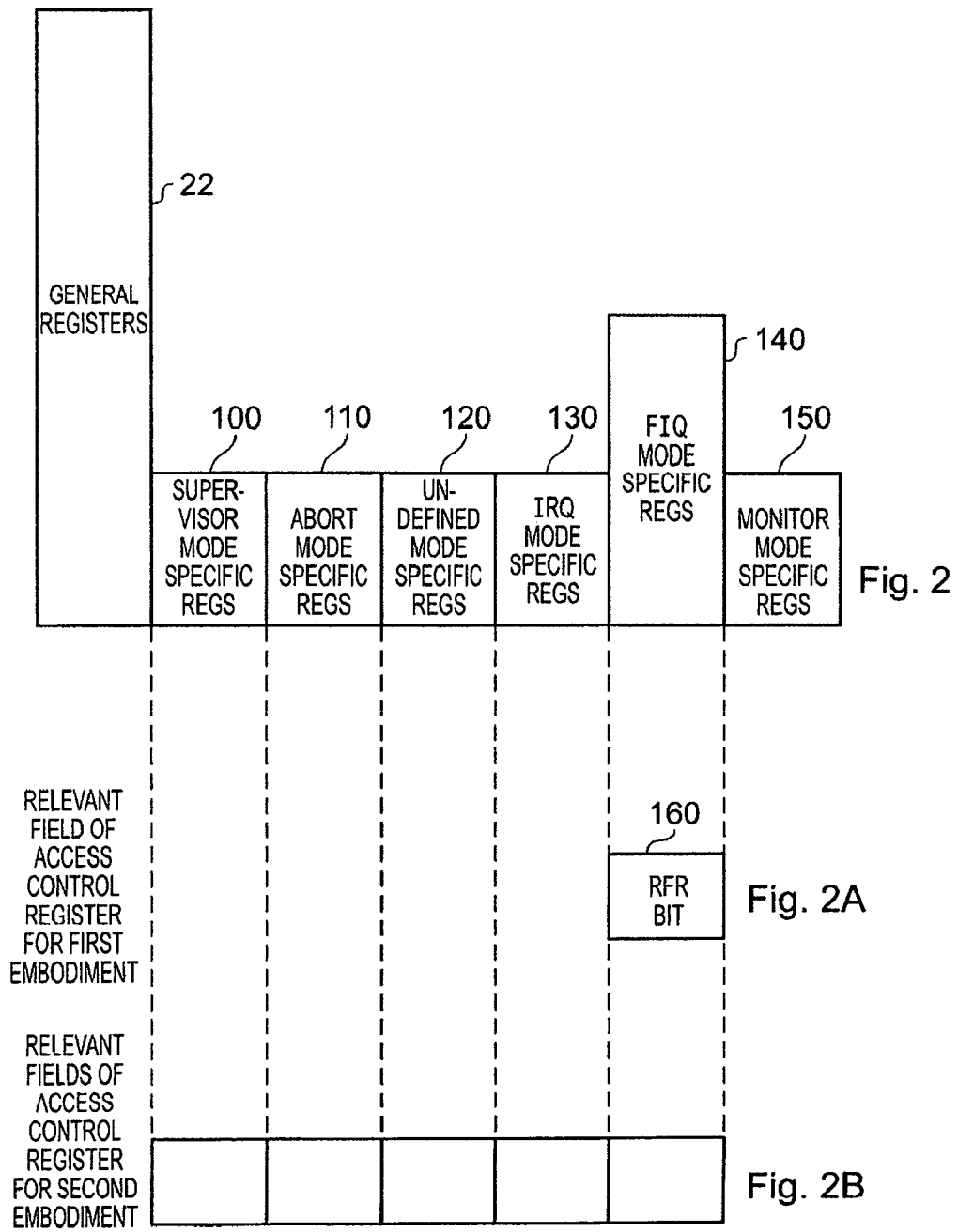

| USER | SYSTEM | SUPERVISOR | ABORT | UNDEFINED | INTERRUPT | FAST INTERRUPT | MONITOR |
|---|---|---|---|---|---|---|---|
| R0 | R0 | R0 | R0 | R0 | R0 | R0 | R0 |
| R1 | R1 | R1 | R1 | R1 | R1 | R1 | R1 |
| R2 | R2 | R2 | R2 | R2 | R2 | R2 | R2 |
| R3 | R3 | R3 | R3 | R3 | R3 | R3 | R3 |
| R4 | R4 | R4 | R4 | R4 | R4 | R4 | R4 |
| R5 | R5 | R5 | R5 | R5 | R5 | R5 | R5 |
| R6 | R6 | R6 | R6 | R6 | R6 | R6 | R6 |
| R7 | R7 | R7 | R7 | R7 | R7 | R7 | R7 |
| R8 | R8 | R8 | R8 | R8 | R8 | R8_FIQ | R8 |
| R9 | R9 | R9 | R9 | R9 | R9 | R9_FIQ | R9 |
| R10 | R10 | R10 | R10 | R10 | R10 | R10_FIQ | R10 |
| R11 | R11 | R11 | R11 | R11 | R11 | R11_FIQ | R11 |
| R12 | R12 | R12 | R12 | R12 | R12 | R12_FIQ | R12 |
| R13 | R13 | R13_SVC | R13_ABT | R13_UND | R13_IRQ | R13_FIQ | R13_MON |
| R14 | R14 | R14_SVC | R14_ABT | R14_UND | R14_IRQ | R14_FIQ | R14_MON |
| PC | PC | PC | PC | PC | PC | PC | PC |

| CPSR | CPSR | CPSR | CPSR | CPSR | CPSR | CPSR | CPSR |
|---|---|---|---|---|---|---|---|
|  |  | SPSR_SVC | SPSR_ABT | SPSR_UND | SPSR_IRQ | SPSR_FIQ | SPSR_MON |

Fig. 3

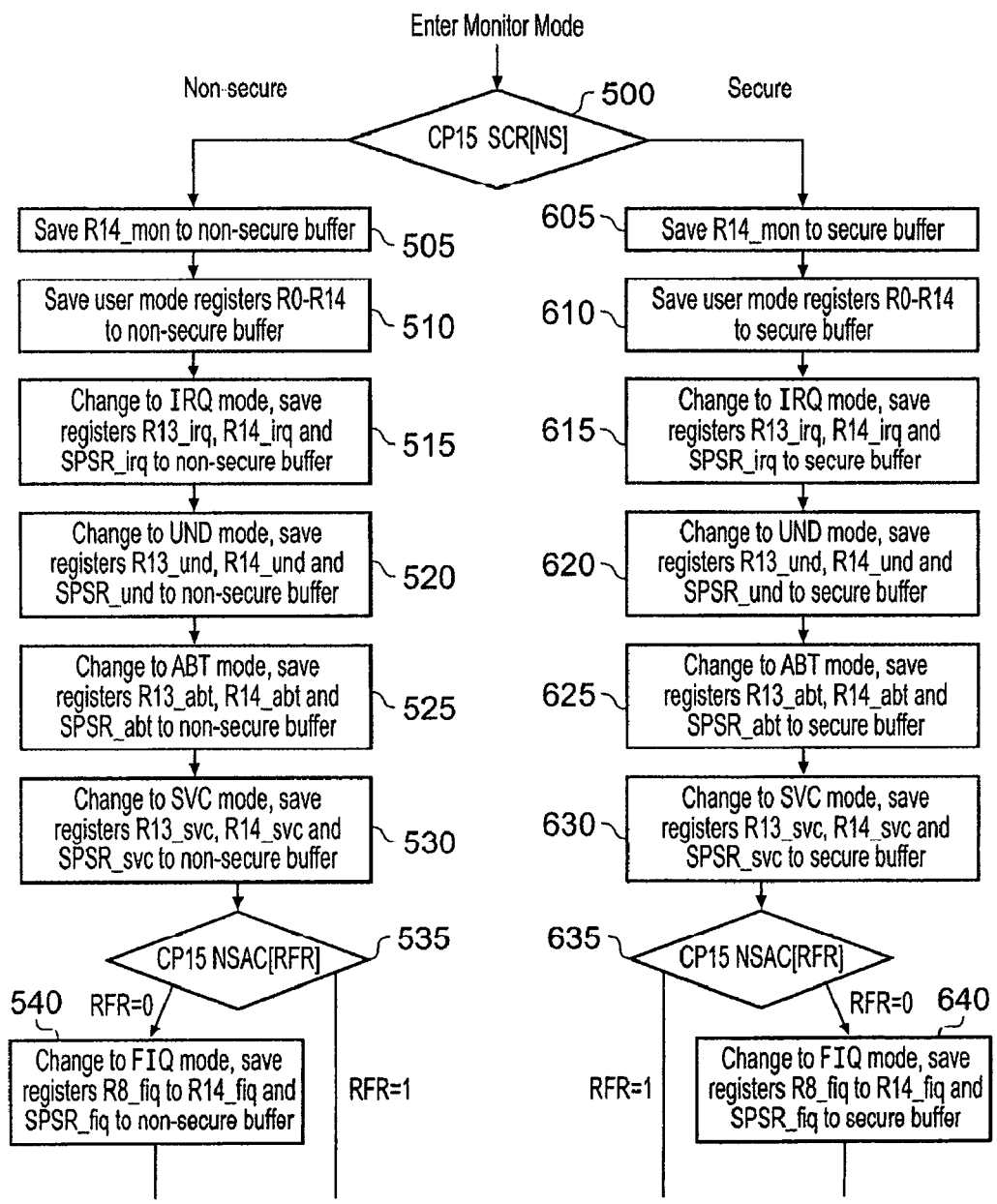
(continued on page 9)
Fig. 8

DATA PROCESSING APPARATUS AND METHOD FOR CONTROLLING ACCESS TO REGISTERS

BACKGROUND OF THE INVENTION

1. Field of the Invention

The present invention relates to a data processing apparatus and method for controlling access to registers of the data processing apparatus.

2. Description of the Prior Art

A known data processing apparatus includes a processing unit for performing data processing operations on data values, with that processing unit having a plurality of modes of operation. Registers are provided for storing data values for access by the processing unit when performing the data processing operations. A subset of those registers may be arranged to be mode specific registers which are for use by the processing unit when operating in an associated mode of operation.

It is also known for such a processing unit to be switchable between a plurality of contexts. For example, to seek to alleviate the reliance on operating system security, it is known to provide a system in which the data processing apparatus is provided with separate domains, these domains providing a mechanism for handling security at the hardware level. Such a system is described for example in commonly assigned co-pending U.S. patent application Ser. No. 10/714,561, now U.S. Pat. No. 7,305,534, the contents of which are herein incorporated by reference, this application describing a system having a secure domain and a non-secure domain. In that system, the non-secure and secure domains in effect establish separate worlds, the secure domain providing a trusted execution space separated by hardware enforced boundaries from other execution spaces, and likewise the non-secure domain providing a non-trusted execution space. Within such a system, a different context may be associated with each domain.

Whilst such systems have been designed with security in mind, it should be noted that security issues are not the only reason for using a data processing apparatus having such domains, and indeed the different domains provided by the data processing apparatus may be used primarily for other purposes. For example, robustness and reliability may be improved through use of such domains. Even if the data in a first domain is not sensitive in the security sense, it may be data which desirably should be protected from being overwritten by bugs in the rest of the platform, for example because such overwriting may cause some critical operation not to happen. By having the hardware split resulting from the use of multiple domains, the software in that first domain should remain intact even if the software executing in another domain operates incorrectly due to a bug.

As another example of a system in which the processing unit may be switchable between a plurality of contexts, the processing unit may implement multiple virtual machines, and each of the contexts may be associated with a different virtual machine. Each virtual machine will typically have an operating system running one or more applications, and a hypervisor layer is provided for switching the operation of the processing unit between different virtual machines.

In a data processing apparatus where the processing unit is switchable between a plurality of contexts, the data values stored in the plurality of registers will typically be dependent on a current context of the processing unit. Accordingly, when the processing unit performs a switch operation to switch from a current context to a new context, it is typically required for the data values in the plurality of registers to be updated having regard to the new context. To achieve this, the data values in the registers are typically written to a buffer provided in the memory system and then the data values associated with the new context are read from another buffer in the memory system into the registers. It has been found that this process takes a significant amount of time, and in particular contributes significantly to the overall amount of time taken to switch between contexts.

Accordingly, it would be desirable to provide an improved technique for reducing the time taken to switch contexts.

In a data processing apparatus having a main processor core used to perform integer operations, and a separate coprocessor provided for performing floating point operations, there will typically be a number of integer registers provided within the processor core and a number of floating point registers provided in the coprocessor. Because not all processes will require the capability to handle floating point operations, not all of those processes require use of the coprocessor registers, and accordingly it is known to selectively disable the coprocessor when a process is being run which does not require floating point computations, hence in effect preventing use of the floating point registers. If a switch of context were to occur whilst the coprocessor is not enabled, it is then not necessary to save the data values in the floating point registers of the coprocessor out to a buffer in the memory system, nor to load new data values into those floating point registers, and accordingly in situations where the coprocessor is not enabled the context switch can proceed more rapidly than would otherwise be the case.

However, whilst such an approach leads to a quicker context switch operation in this specific scenario, it does not assist in speeding up the operation of changing context in the more general case, for example where the coprocessor is enabled, or where there is no coprocessor. In any event, all of the registers in the processor core still need to have their data values updated to reflect the new context, and hence there is still a significant overhead involved in changing context.

SUMMARY OF THE INVENTION

Viewed from a first aspect, the present invention provides a data processing apparatus comprising: a processing unit for performing data processing operations on data values, the processing unit having a plurality of modes of operation; a plurality of registers for storing data values for access by the processing unit when performing said data processing operations, a subset of said registers being mode specific registers, each mode specific register being for use by the processing unit when operating in an associated mode of operation; the processing unit further being switchable between a plurality of contexts, the data values stored in said plurality of registers being dependent on a current context of the processing unit, the processing unit being operable to perform a switch operation to switch from the current context to a new context during which the data values in said plurality of registers are updated having regard to the new context; a control register which, for at least one mode of operation having at least one mode specific register associated therewith, has an access field which is programmable by the processing unit when operating in a predetermined mode of operation, when the access field is set the processing unit being selectively denied access to said associated at least one mode specific register, whereby updating of the data values in said associated at least one mode specific register is avoided during said switch operation.

In accordance with the present invention, a control register is provided which is programmable by the processing unit when operating in a predetermined mode of operation. For at least one mode of operation that has one or more mode specific registers associated therewith, the control register provides an access field, and when the access field is set the processing logic is selectively denied access to the associated mode specific registers. As a result, if the access field is set, the data values in those associated mode specific registers are not updated during the switch operation, thereby reducing the time taken to perform the switch operation.

Hence, in accordance with the present invention, for any mode of operation that employs one or more mode specific registers, the control register can be programmed to identify that the content of those mode specific registers is not to be updated during the switch operation, and that the processing logic is to be selectively denied access to those mode specific registers.

This process is hence generically applicable to any processing unit which has access to mode specific registers that are used only in particular modes of operation.

There are a number of ways in which, if the access field is set, the processing logic can be selectively denied access to the associated mode specific register(s). In one embodiment, when the access field is set the processing logic is denied access to said associated at least one mode specific register if the current context is at least one predetermined context, in which event during said switch operation the data values in said at least one mode specific register are not updated if either the current context or the new context is said at least one predetermined context. Accordingly, for any switch operation switching from or to the at least one predetermined context, the data values in any mode specific registers associated with a set access field are not updated, thereby significantly increasing the speed of the context change.

In one such embodiment, the plurality of modes include at least a first interrupt mode and a second interrupt mode, and the access field of the control register is associated with at least one mode specific register of the first interrupt mode, whereby when the access field is set the processing unit is denied access to said associated at least one mode specific register of the first interrupt mode if the current context is said at least one predetermined context. Accordingly, by such an approach, when the current context is said at least one predetermined context, the processing unit cannot enter the first interrupt mode, or at least cannot make use of the data in the registers if the first interrupt mode is entered.

In one particular embodiment, the data processing apparatus has a secure domain and a non-secure domain in which devices of the data processing apparatus can operate, and each of said plurality of contexts is associated with one of those domains, the processing unit being operable to process in the secure domain interrupts issued to the processing unit that are associated with the first interrupt mode and being operable to process in the non-secure domain interrupts issued to the processing unit that are associated with the second interrupt mode. Accordingly, by such an approach, an interrupt issued to the processing unit will be handled in either the secure domain or the non-secure domain, depending on which interrupt mode the interrupt is associated with. It has been found that by converting the first interrupt mode into one which can only be accessed when the processing unit is in the secure domain, this provides a very significant reduction in the number of cycles required to traverse between the secure and non-secure domains, because the switch operation no longer has to save and restore any mode specific registers associated with that first interrupt mode, due to the fact that any non-secure code in the non-secure domain cannot access the contents of those mode specific registers.

Whilst in the above example a data processing apparatus having a secure domain and a non-secure domain has been discussed, in a more general embodiment the data processing apparatus may have a plurality of domains in which devices of the data processing apparatus can operate, which may or may not include a secure domain and a non-secure domain. In embodiments where the plurality of domains comprise a secure domain and a non-secure domain (with or without one or more additional domains), then in one embodiment the at least one predetermined context is a context associated with the non-secure domain, whereby when the access field is set the processing logic is denied access to the associated at least one mode specific register if the current context is said at least one predetermined context associated with the non-secure domain.

In an alternative embodiment, when the access field is set the processing unit is unconditionally denied access to said associated at least one mode specific register following said switch operation, whereby updating of the data values in said associated at least one mode specific register is avoided during said switch operation. Hence, in such embodiments, irrespective of the new context that is being switched to, the processing logic will be denied access to any mode specific register associated with a set access field following the switch operation.

In one such embodiment, multiple of said plurality of modes of operation each have at least one mode specific register associated therewith, the control register providing an access field for each of said multiple modes of operation, during the switch operation the access fields being set by the predetermined mode of operation, whereby updating of the data values in the mode specific registers associated with the multiple modes of operation is avoided during said switch operation. By such an approach, all mode specific registers are not updated during the switch operation, thereby significantly increasing the speed of the context change.

In embodiments which unconditionally deny access to any mode specific registers associated with a set access field following a switch operation, there will typically be instances where the processing unit attempts to access one of those mode specific registers after the switch operation. There are a number of ways in which such an attempted access could be handled. In one embodiment, if following the switch operation the processing unit in the new context requests access to a mode specific register whose associated access field is set, an exception is generated.

The exception generated in such a manner can be handled in a variety of ways. However, in one embodiment, the processing unit is operable in response to the generated exception to perform an access control operation: to determine if the data values currently stored in the at least one mode specific register of the mode of operation with which the mode specific register being accessed is associated belong to the new context; if not, to update the data values in the at least one mode specific register of that mode of operation having regard to the new context and clear the associated access field; if so, to clear the associated access field. Accordingly, in such embodiments steps are taken to update, if necessary, the content of the mode specific registers as and when access to them is required by the processing unit, with the relevant access field then being cleared.

It will be appreciated that the logic values written into any particular access field to specify the set condition or the clear condition can be varied dependent on the implementation. In one embodiment, a logic one value is written into the access field to set the access field, and a logic zero value is written into the access field to clear the access field, but it will be appreciated that in an alternative embodiment these logic values could have opposite meanings.

It will be appreciated that the plurality of contexts used by the processing unit can be provided for a variety of reasons, dependent on the type of data processing apparatus. In one embodiment, the data processing apparatus has a plurality of domains in which devices of the data processing apparatus can operate, and each of said plurality of contexts is associated with one of those domains. In an alternative embodiment, each of the contexts is associated with a virtual machine run on the processing unit.

The plurality of registers can be arranged in a variety of ways. However, in one embodiment, the plurality of registers comprise multiple banks of registers, and for each mode of operation having mode specific registers, those mode specific registers are provided in a separate bank. Typically, a number of the registers will be standard user mode registers, and the mode specific registers will be used in the associated mode of operation to replace one or more of the standard user mode registers.

The predetermined mode of operation in which the access field is programmable can take a variety of forms. However, in one embodiment, that predetermined mode of operation is a monitor mode, and the switch operation is performed by the processing unit when in that monitor mode. Hence, the programming of the one or more access fields, and the performance of the switch operation, are both implemented from the same monitor mode of operation.

In one embodiment, the earlier-mentioned access control operation is also performed by the processing unit when in the monitor mode.

Viewed from a second aspect, the present invention provides a data processing apparatus comprising: processing means for performing data processing operations on data values, the processing means having a plurality of modes of operation; a plurality of register means for storing data values fur access by the processing means when performing said data processing operations, a subset of said register means being mode specific register means, each mode specific register means being for use by the processing means when operating in an associated mode of operation; the processing means further being switchable between a plurality of contexts, the data values stored in said plurality of register means being dependent on a current context of the processing means, the processing means for performing a switch operation to switch from the current context to a new context during which the data values in said plurality of register means are updated having regard to the new context; a control register means which, for at least one mode of operation having at least one mode specific register means associated therewith, has an access field which is programmable by the processing means when operating in a predetermined mode of operation, when the access field is set the processing means being selectively denied access to said associated at least one mode specific register means, whereby updating of the data values in said associated at least one mode specific register means is avoided during said switch operation.

Viewed from a third aspect, the present invention provides a method of controlling access to registers in a data processing apparatus having a processing unit for performing data processing operations on data values, the processing unit having a plurality of modes of operation, and a plurality of registers for storing data values for access by the processing unit when performing said data processing operations, a subset of said registers being mode specific registers, each mode specific register being for use by the processing unit when operating in an associated mode of operation, the processing unit further being switchable between a plurality of contexts, the data values stored in said plurality of registers being dependent on a current context of the processing unit, the method comprising the steps of: performing a switch operation to switch from the current context to a new context during which the data values in said plurality of registers are updated having regard to the new context; for at least one mode of operation having at least one mode specific register associated therewith, programming an associated access field of a control register, such programming being performed by the processing unit when operating in a predetermined mode of operation; when the access field is set, selectively denying the processing unit access to said associated at least one mode specific register, and when the access field is set, not updating the data values in said associated at least one mode specific register during said switch operation.

BRIEF DESCRIPTION OF THE DRAWINGS

The present invention will be described further, by way of example only, with reference to embodiments thereof as illustrated in the accompanying drawings, in which:

FIG. 2 is a diagram illustrating the general registers and mode specific registers of one embodiment of the present invention;

FIGS. 2A and 2B are diagrams illustrating the relevant fields within the access control register of FIG. 1 used in a first embodiment of the present invention and a second embodiment of the present invention, respectively;

FIG. 3 is a diagram illustrating the available registers in one embodiment of the present invention, depending on the processor mode of operation;

DESCRIPTION OF EMBODIMENTS

Figure 1:
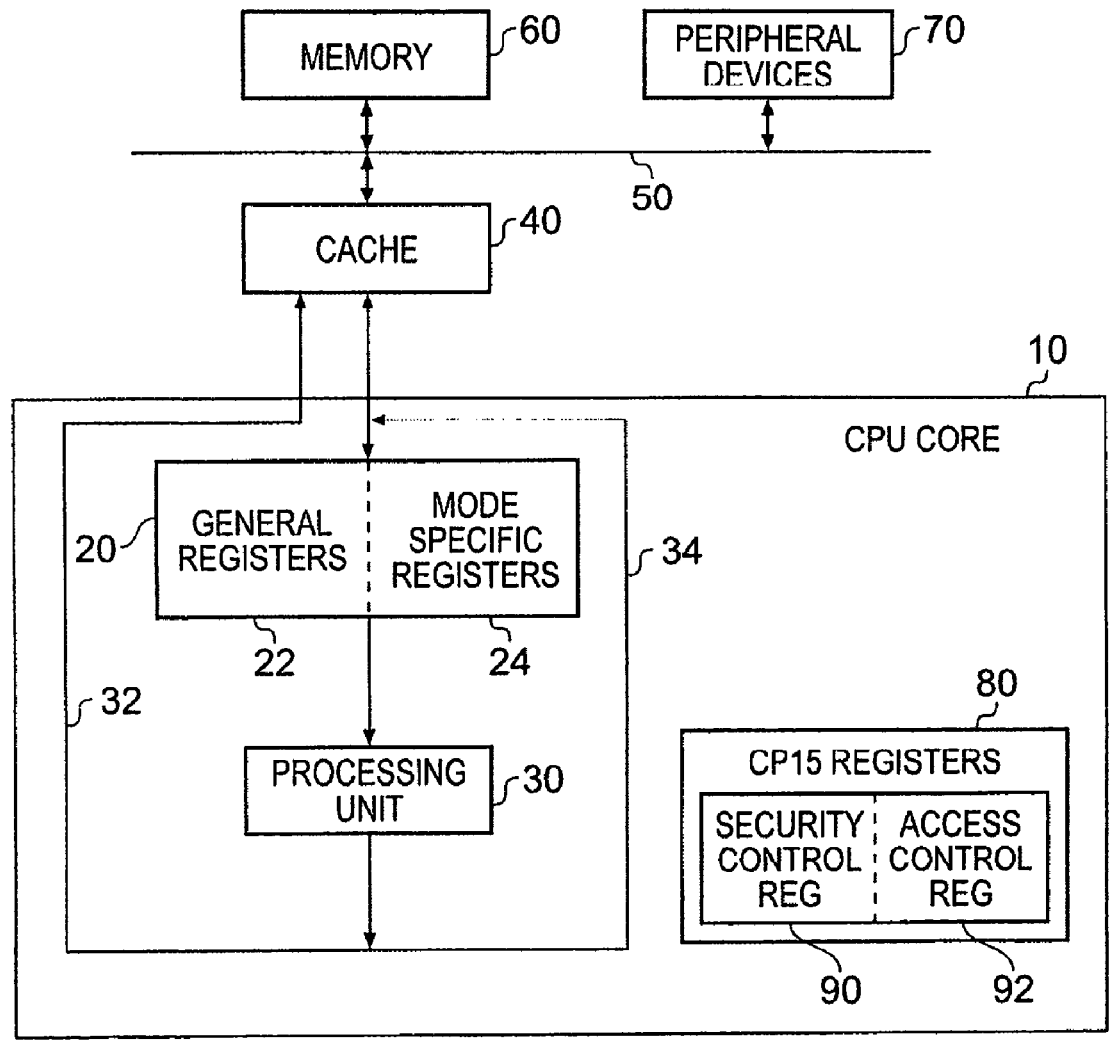
FIG. 1 is a block diagram of a data processing system in accordance with one embodiment of the present invention.

FIG. 1 is a block diagram of a data processing system in accordance with one embodiment of the present invention. In accordance with this embodiment, a central processing unit (CPU) core 10 has a processing unit 30 for performing data processing operations on data values contained in registers 20. The data values stored in the registers 20 may be loaded into the registers from the memory system, which may include a cache 40 via which the CPU core 10 is coupled to external memory 60. Further, data may be stored from the registers 20 back to the memory system via cache 40. Data values produced by the processing unit 30 may be routed via path 34 to the registers 20, or alternatively may be output over path 32 to the cache 40.

In accordance with the embodiment shown, when the CPU core 10 issues an access request for a data value, it will first be ascertained whether the data value is stored in the cache 40, and if so the data value will be accessed in the cache. However, if the data value is not in the cache, then a linefill process will be invoked to cause a cache line's worth of data to be retrieved from memory 60 for storing in the cache, whereafter die data value the subject of the access request will be accessed. For an access request in respect of an address which is non-cacheable, the cache merely propagates the request onto the bus without performing a cache lookup.

A system bus 50 is provided via which a number of devices can be coupled to the CPU core 10, for example the memory device 60 discussed earlier, or one or more peripheral devices 70. Such peripheral devices may take a variety of forms, for example hardware accelerator devices, timers, real time clocks, counters, keyboard/mouse interfaces, etc.

The registers 20 accessible to the processing unit 30 are arranged as a plurality of banks of registers. A plurality of general registers 22 are provided and in addition a number of mode specific registers 24 are provided in one or more additional banks. The processing unit has a plurality of modes of operation in which it may operate, including a user mode of operation and a number of privileged modes of operation. The general registers 22 are used by the user mode of operation, and in one embodiment at least one of the privileged modes, and for certain privileged modes one or more mode specific registers 24 are used in the place of one or more corresponding registers from the general registers 22. The registers used in any particular mode of operation will be discussed later with reference to FIG. 3.

The CPU core 10, and in particular the processing unit 30 therein, is able to switch between a plurality of contexts, with the data values stored in the plurality of registers 20 being dependent on a current context of the processing unit 30. When switching contexts, the processing unit is operable in a predetermined mode of operation to perform a switch operation to switch from the current context to a new context during which the data values in the registers 20 are updated having regard to the new context. A significant amount of the time spent in performing context switching operations is taken up with the storing of the contents of the registers 20 to a buffer in memory associated with the current context, followed by the reading of data values into the registers 20 from a buffer in memory associated with the new context. In accordance with embodiments of the present invention, the processing unit can selectively be denied access to one or more of the mode specific registers, as a result of which those mode specific registers do not need to be updated during the switch operation, thereby reducing the time taken to switch context.

A number of processor configuration registers, also referred to herein as CP15 registers 80, are provided for storing data used to configure the operation of the CPU core 10. Of particular interest to embodiments of the present invention are a security control register 90 and an access control register 92. The security control register 90 has a number of fields, including fields which can be set to indicate whether an interrupt should trap to a monitor mode of operation. In accordance with a first embodiment of the present invention, the access control register 92 includes a field called an RFR (Reserve FIQ banked Registers) field which if set indicates that the FIQ banked Registers are reserved for a particular context. In a second embodiment the access control register 92 includes a field for one or more sets of mode specific registers, and if set causes the processor to unconditionally be denied access to the associated mode specific registers. The use of the security control register 90 and the access control register 92 will be discussed in more detail later.

FIG. 2 illustrates in more detail the registers 20 provided in accordance with an embodiment of the present invention. In addition to the general registers 22, a number of mode specific registers are provided, including supervisor mode specific registers 100, abort mode specific registers 110, undefined mode specific registers 120, standard interrupt (IRQ) mode specific registers 130, fast interrupt (FIQ) mode specific registers 140 and monitor mode specific registers 150.

One example of the contexts between which the processing unit may switch are those contexts associated with a secure domain and a non-secure domain. These domains provided a mechanism for handling security at the hardware level, with the secure domain providing a trusted execution space separated by hardware enforced boundaries from other execution spaces such as the non-secure domain. Such a system is described for example in the earlier-mentioned commonly assigned co-pending U.S. patent application Ser. No. 10/714, 561, now U.S. Pat. No. 7,305,534. In such an embodiment, the monitor mode is only available in the secure domain, and accordingly the monitor mode specific registers 150 are only accessible from the secure domain. However, in principle, all of the other modes of operation are replicated in both domains and accordingly when performing the switch operation to switch from one domain to another, it is typically necessary to store the contents of all the registers 22, 100, 110, 120, 130, 140 to the appropriate buffer in memory, and than load in new contents for those registers from another buffer associated with the domain being switched to. In accordance with the first embodiment of the present invention, as shown in FIG. 2A, an RFR bit 160 is provided in the access control register 92 which if set indicates that the FIQ mode specific registers 140 are reserved for the secure domain. As a result, the content of the FIQ mode specific registers 140 do not need to be altered during the context switch operation between the secure domain and the non-secure domain in either direction, and instead the FIQ mode specific registers 140 cannot be accessed by the processing unit when operating in the non-secure domain. In one embodiment, the RFR bit 160 of the access control register 92 is readable from the non-secure domain, thereby allowing simple discovery of accessibility of the FIQ banked registers 140 for both debug and the non-secure operating system. In the secure domain, the RFR bit 160 is both readable and writable.

In accordance with an alternative embodiment of the present invention, as shown in FIG. 2B, separate fields are provided in association with each of the mode specific registers 100, 110, 120, 130, 140, and when performing a context switch operation these fields are set as part of the context switch operation, and the contents of the associated mode specific registers are not updated during the context switch operation. This significantly saves time during the context switch operation. Following the context switch operation, the set state of these fields causes the processing unit to unconditionally be denied access to any of those mode specific registers. Instead, as will be discussed later, if the processing unit following the context switch seeks to access any of those registers, an exception is generated which causes the monitor mode to be entered, and then within the monitor mode an access control operation is performed to update the contents of the relevant mode specific registers if required, and to then clear the relevant access field in the access control register 92.

FIG. 3 is a diagram illustrating the registers available in any particular mode of operation in accordance with one embodiment of the present invention. As can be seen, the general registers 22 contain 15 registers R0 to R15, where R15 is used to store a program counter (PC) value, and a CPSR (current processor status register) register used to identify the current mode of operation of the processor. Considering the privileged modes of operation, the system mode of operation uses the general registers 22, but for each of the other privileged modes, certain banked mode specific registers are used in place of one or more of the general registers. In particular, in the supervisor, abort, undefined or standard interrupt (IRQ) modes, the registers R13 and R14 are replaced with mode specific variants, whilst for the fast interrupt (FIQ) mode registers R8 to R14 are replaced with mode specific variants. Furthermore, in all of the privileged modes other than the system mode, an SPSR (saved processor status register) mode specific register is provided.

As also shown in FIG. 3, the monitor mode uses mode specific variants of R13 and R14 registers and also uses an SPSR_MON register. As discussed earlier, since the monitor mode can only be used in the secure domain, the contents of R13_MON, R14_MON and SPSR_MON are not updated when performing the context switch operation. However, in accordance with the first embodiment of the present invention discussed with reference to FIG. 2A, if the RFR bit 160 is set, the eight FIQ mode specific registers 140 are also not updated when performing the context switch operation, and instead these registers are made unavailable in the non-secure domain. Alternatively in accordance with the second embodiment of the present invention discussed earlier with reference to FIG. 2B, all of the mode specific registers associated with the supervisor, abort, undefined, interrupt or fast interrupt modes are not updated when performing the content switch operation, and initially following the context switch operation the processing unit is unconditionally denied access to any of those registers.

Figure 4:
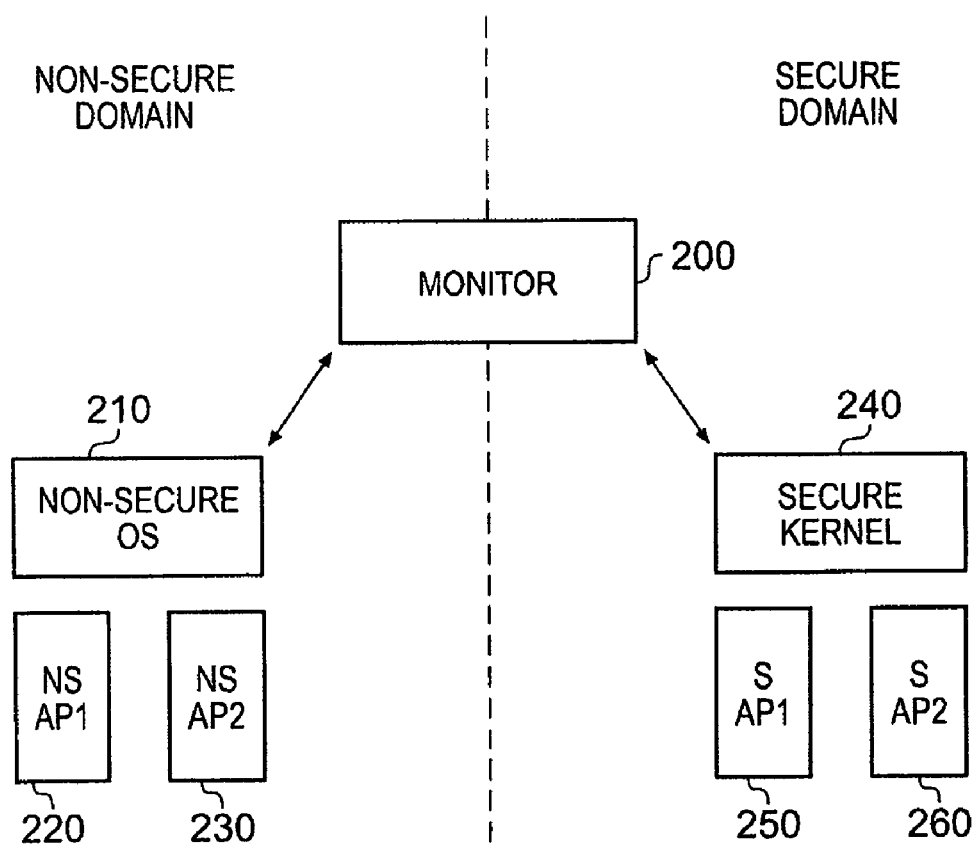
FIG. 4 schematically illustrates the use of a non-secure domain and a secure domain in accordance with one embodiment of the present invention.

FIG. 4 is a block diagram illustrating the use of monitor mode code to manage the transition from the non-secure domain to the secure domain and vice versa. FIG. 4 schematically illustrates various programs running on a processing system having a secure and a non-secure domain. The system is provided with a monitor program 200 which executes at least partially in the monitor mode. The monitor program 200 is responsible for managing all changes between the secure and the non-secure domain in either direction. From a view external to the CPU core 10, the monitor mode is always secure and the monitor program is in secure memory.

Within the non-secure domain there is provided a non-secure operating system 210 and a plurality of non-secure application programs 220, 230 which execute in co-operation with the non-secure operating system 210. In the secure domain, a secure kernel program 240 is provided. The secure kernel program 240 can be considered to form a secure operating system. Typically such a secure kernel program 240 will be designed to provide only those functions which are essential to processing activities which must be provided in the secure domain, such that the secure kernel 240 can be as small and simple as possible since this will tend to make it more secure. A plurality of secure applications 250, 260 are illustrated as executing in combination with the secure kernel 240.

Figure 5:
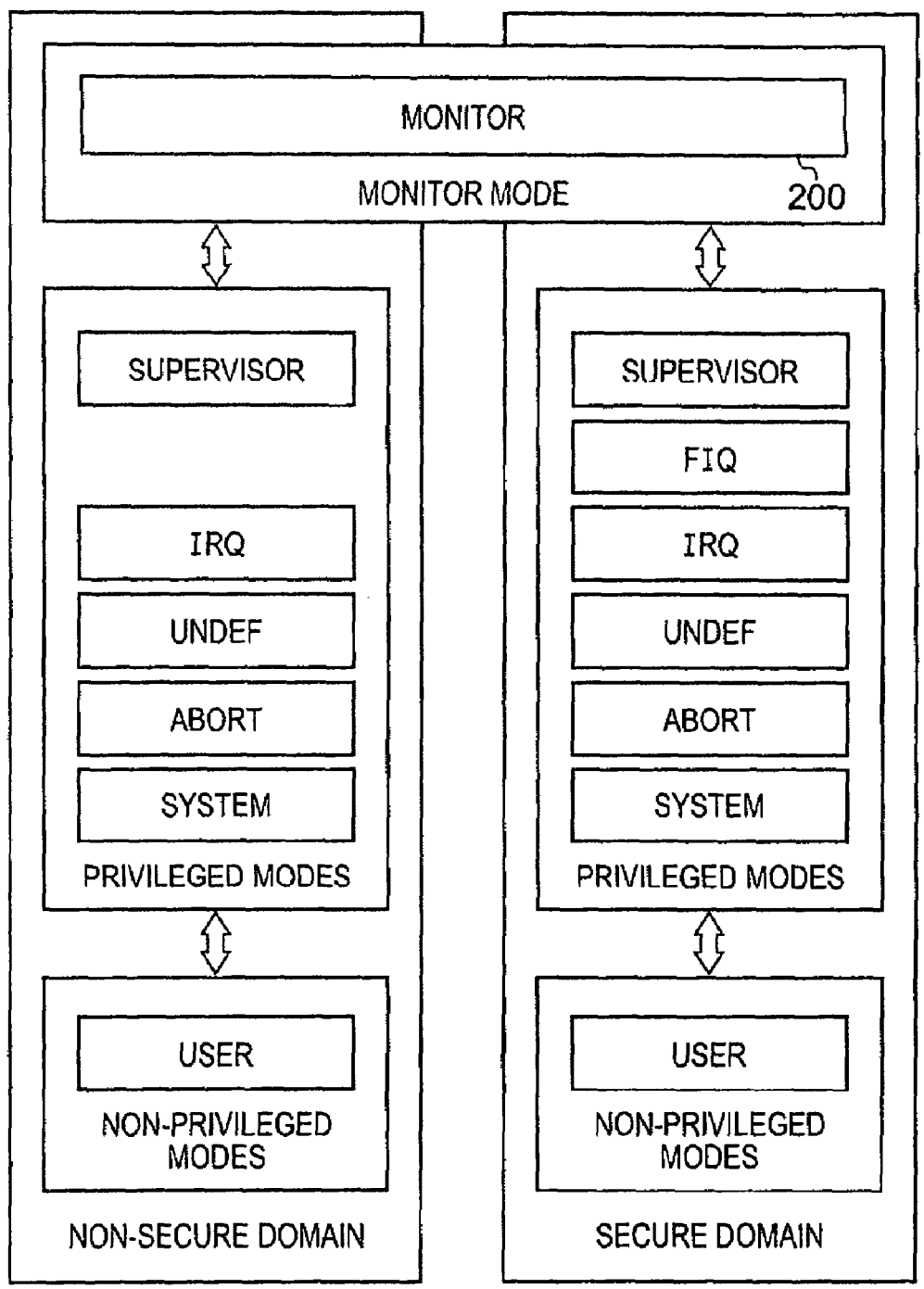
FIG. 5 is a diagram illustrating how the modes of operation are replicated in the non-secure domain and the secure domain, with the exception of the fast interrupt (FIQ) mode which in accordance with one embodiment of the present invention is not available in the non-secure domain.

FIG. 5 schematically illustrates the replication of the various modes between the secure domain and the non-secure domain and the use of the monitor program 200 to handle the transition between the two domains. It will be noted that the FIQ mode is not shown as being replicated in the non-secure domain. This is due to the fact that, in accordance with the first embodiment of the present invention, if the RFR bit 160 of the access control register 92 is set, the FIQ mode is not available in the non-secure domain, and in particular the FIQ mode specific registers cannot be accessed from the non-secure domain, and accordingly their contents do not need to be updated when transitioning between the two domains.

Figure 6:
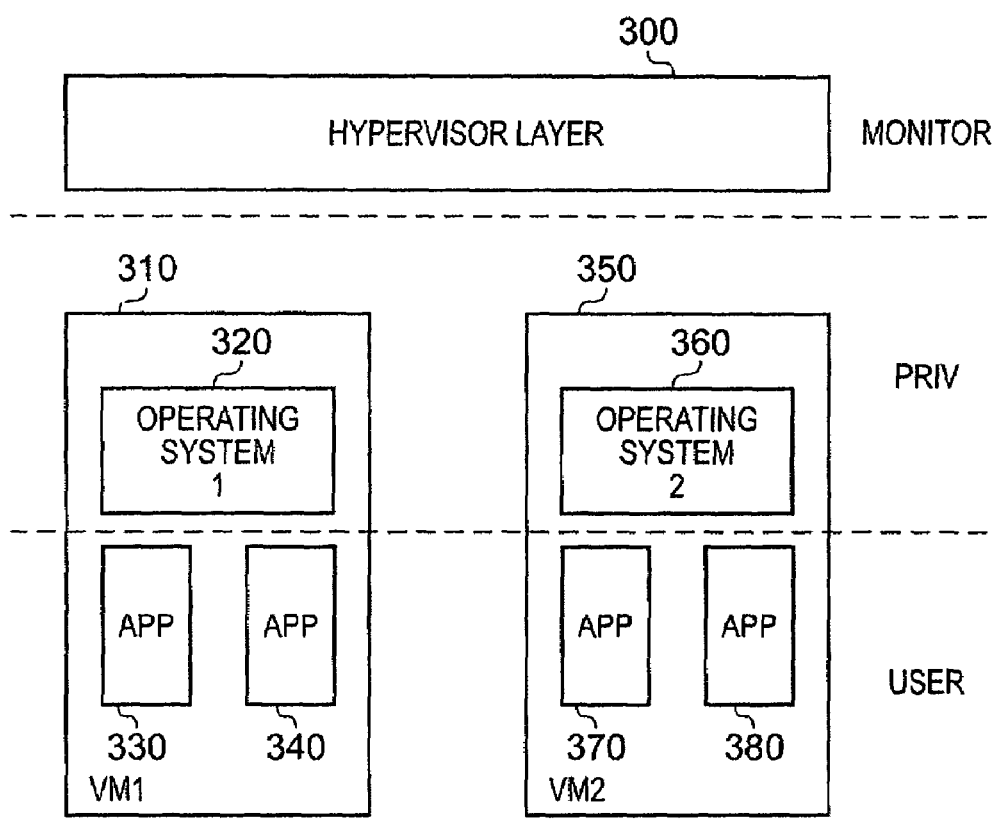
FIG. 6 is a diagram illustrating the use of multiple virtual machines in accordance with one embodiment of the present invention.

Whilst both of the first and second embodiments discussed earlier with reference to FIGS. 2A and 2B can be used within a system where each of the plurality of contexts that may he switched between are associated with a different domain, the second embodiment is of more general applicability to systems where the context may be associated with other features of the system. One example of such an embodiment is shown in FIG. 6, where the data processing apparatus is arranged to run multiple virtual machines. In the particular example indicated, two virtual machines 310 and 350 are shown, although it will be appreciated that the system can be extended to cover any number of virtual machines. The first virtual machine 310 consists of a number of applications 330, 340 running under a first operating system 320. Similarly, the second virtual machine 350 consists of a number of applications 370, 380 running under a second operating system 360. At any point in time, the processing unit 30 of the CPU core 10 will be arranged to implement one of these virtual machines, and a hypervisor layer 300 is provided for managing the switch from one virtual machine to another virtual machine. During this switch operation, it would typically be necessary to update the contents of the registers 20 so as to save to a buffer in memory the data values in the registers associated with the current virtual machine, and then load into those registers from another buffer the corresponding data values associated with the new virtual machine. As with the earlier described embodiment having a secure domain and a non-secure domain, the processing unit may have a plurality of modes of operation, including a user mode of operation in which the various applications 330, 340, 370, 380 are run, and one or more privileged modes of operation accessible to the operating system 320, 360 of the virtual machine 310, 350 currently being implemented by the processing unit. The hypervisor layer 300 can be considered analogous to the earlier-described monitor mode of operation since it is responsible for performing the switch operation to switch from one context to another context, in this example a context associated with one virtual machine to a context associated with a different virtual machine.

Figure 7:
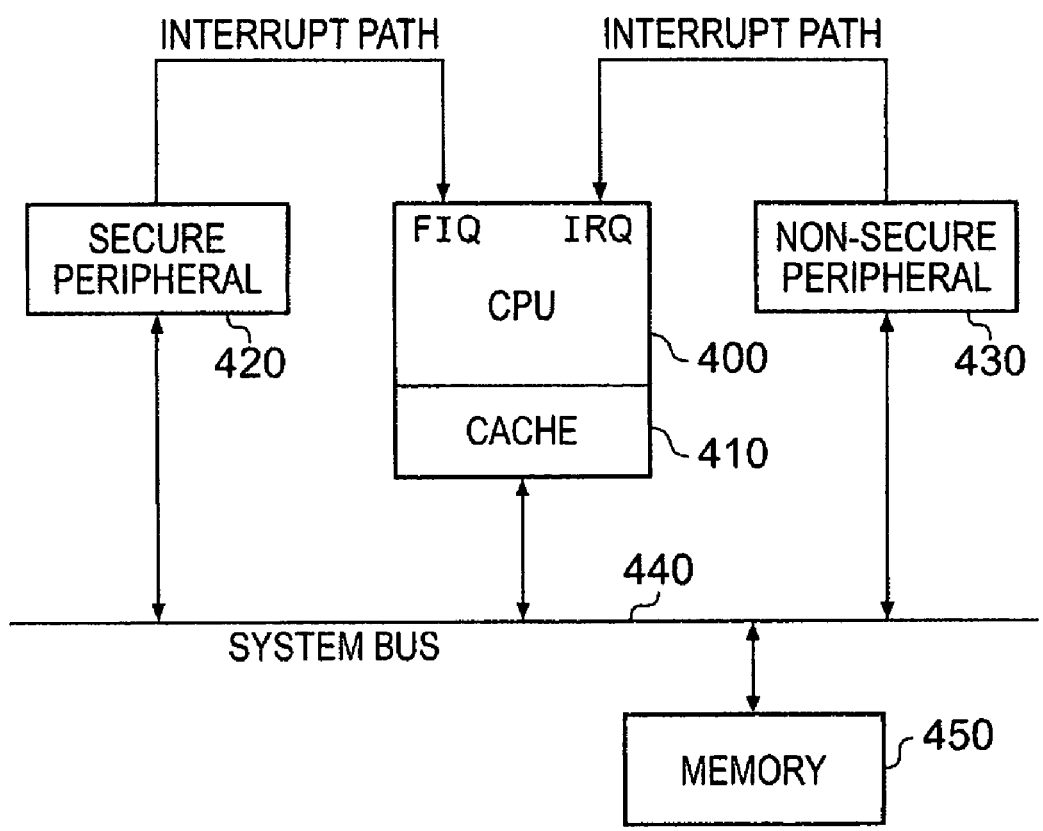
FIG. 7 is a block diagram illustrating the use of the fast interrupt (FIQ) mode and standard interrupt (IRQ) mode in accordance with one embodiment of the present invention.

FIG. 7 is a block diagram of a data processing system in accordance with one embodiment of the present invention, and in particular illustrates a first embodiment of the present invention where the data processing apparatus has a secure domain and a non-secure domain, and the FIQ mode specific registers 140 are reservable solely to the secure domain by setting of the RFR bit 160 within in the access control register 92. In an analogous way to that discussed earlier with reference to FIG. 1, a CPU 400 is coupled via an associated cache 410 with a system bus 440, via which it can communicate with a memory system 450 (which may for example be arranged as a number of hierarchical layers of memory) and one or more peripheral devices. Via the monitor mode, the CPU 400 can transition between the secure domain and the non-secure domain. Individual peripheral devices may be configured so as to only be useable by the CPU 400 when the CPU 400 is in a particular domain. For example, the secure peripheral 420 may be arranged to only be accessible to the CPU 400 when the CPU 400 is in the secure domain. The non-secure peripheral 430 may be configured to only be accessible to the CPU 400 when the CPU 400 is in the non-secure domain. However, in one embodiment non-secure peripherals such as non-secure peripheral 430 are arranged to be accessible by the CPU 400 when executing in either domain.

The CPU 400 is arranged when seeking to access the peripheral devices 420, 430, or indeed the memory 450, to output a security bit, hereafter referred to as the NS bit, onto the system bus 440 in association with the access request to indicate the current domain in which the CPU 400 is operating. If the NS bit has a logic zero value, this indicates that the CPU 400 is executing in the secure domain, whereas if the NS bit has a value of 1, this indicates that the CPU 400 is executing in the non-secure domain. The secure peripheral 420 will be arranged to only allow access by the CPU if the associated NS bit has a logic zero value, indicating that the CPU 400 is operating in die secure domain.

When a peripheral device requires the CPU 400 to take some action, it will issue an interrupt to the CPU 400. In accordance with a known CPU architecture, interrupts can either be standard interrupts (known as IRQ interrupts) or fast interrupts (known as FIQ interrupts), and FIQ interrupts are arranged to have higher priority than IRQ interrupts. In systems which are arranged to execute in either a secure domain or a non-secure domain, it is proposed to allow the secure domain to use FIQ interrupts as general purpose secure interrupts. Similarly, the non-secure domain is arranged to use IRQ interrupts as general purpose non-secure interrupts. This usage model prevents FIQ interrupts being signalled to the non-secure domain. However, prior to the present invention, the non-secure domain would have the ability to switch into the FIQ mode of operation and thereafter gain access to the FIQ banked registers. As a result, it would still be necessary when switching between domains for the monitor code to store out the contents of the FIQ mode specific registers and load in replacement values applicable to the domain being switched to. However, in accordance with a first embodiment of the present invention, the secure domain software is allowed to prevent the non-secure domain accessing the banked FIQ registers through setting of an RFR bit within the access control register 92, thus removing the need for monitor code to save and restore the FIQ mode specific registers when switching between domains. It has been found that such an approach leads to approximately a 20 percent performance improvement for the monitor code when performing such context switch operations.

The RFR bit hence controls whether or not software executing in the non-secure domain is able to enter FIQ mode, and access the FIQ banked registers. The RFR bit is readable and writable from the secure domain, but only readable from the non-secure domain. Reading the RFR bit from the non-secure domain allows non-secure software to determine whether or not it is able to use any FIQ resources. In one particular embodiment, if software executing in the secure domain clears the RFR bit to a logic zero value, this indicates that the FIQ banked registers are accessible to software executing in both secure and non-secure domains. However, if such secure software sets the RFR bit to a logic one value, this indicates that the FIQ banked registers are only accessible to software executing in the secure domain. When the RFR bit is set, execution of any instruction on the CPU in a non-secure domain which attempts to switch the CPU into FIQ mode or access any of the FIQ banked registers results in "unpredictable" behaviour. Such "unpredictable" behaviour is safe in that it cannot introduce a security violation, and in particular cannot cause the CPU executing in the non-secure domain to transition to the secure domain, and as a result cannot cause the CPU to gain access to any data values stored in the registers associated with the secure domain. Accordingly, if the RFR bit is set, any attempt by an application running in the non-secure domain to alter bits in the CPSR register in an attempt to cause a transition to the FIQ mode of operation will result in said unpredictable behaviour. In one particular embodiment, this is achieved by setting a control bit within the security control register 90 which prevents the non-secure domain software from altering the CPSR_FIQ register.

From the above description of FIG. 7, it will be understood that in accordance with such an embodiment interrupts issued from non-secure peripherals are routed as IRQ interrupts to the CPU 400, whilst interrupts issued by secure peripherals are routed as FIQ interrupts to the CPU 400. By assigning IRQ and FIQ interrupts to alternate security domains, this raises the question of how the system should behave when a secure (FIQ) interrupt is signalled whilst the core is in the non-secure domain, and similarly how such a system should behave when a non-secure (IRQ) interrupt is signalled whilst the core is in the secure domain. In accordance with one embodiment of the present invention, this is achieved by arranging software executing in the secure domain to program certain fields within the security control register (SCR) 90 such that if the CPU security state matches that of the interrupt (i.e. non-secure domain and an IRQ interrupt request, or secure domain and an FIQ interrupt request) then code execution should proceed via the vector table which belongs to that CPU state. However, if the security state of the CPU does not match that of the interrupt, then the programming of the relevant fields in the security control register 90 causes code execution to proceed via the monitor mode's table which switches CPU stale such that execution resumes via the appropriate vector table entry with the CPU in the required security state. This process is summarised in Table 1 below:

TABLE 1

| Interrupt Source | Core security status | CP15.SCR setting | Comment |
|---|---|---|---|
| IRQ (non-secure interrupts) | Non-secure | Don't trap to monitor | Process in non-secure domain |
| | Secure | Trap to monitor | Monitor code switches CPU from |

TABLE 1-continued

| Interrupt Source | Core security status | CP15.SCR setting | Comment |
| --- | --- | --- | --- |
| FIQ (secure interrupts) | Monitor | n/a | secure to non-secure state, restarting non-secure software execution via the non-secure IRQ vector table entry. CPSR.I set, so IRQs ignored in monitor mode |
| | Non-secure | Trap to monitor | Monitor code switches CPU from non-secure to secure state, restarting secure software execution via the secure FIQ vector table entry. |
| | Secure | Don't trap to monitor | Process in secure domain |
| | Monitor | n/a | CPSR.F set, so FIQs ignored in monitor mode |

Hence, in summary, as shown in Table 1, when monitor code switches from the secure domain to the non-secure domain, secure software programs the SCR register such that IRQs interrupts use the non-secure vector table, and FIQ interrupts trap to the monitor mode's vector table. In contrast, when switching from the non-secure domain to the secure domain, such secure software programs the SCR register such that FIQ interrupts use the secure vector table and IRQ interrupts trap to the monitor mode's vector table. In either event, any interrupts received whilst the core is in the monitor mode arc ignored, this being achieved by setting of the relevant bits within the CPSR register whilst in the monitor mode.

Figure 8:
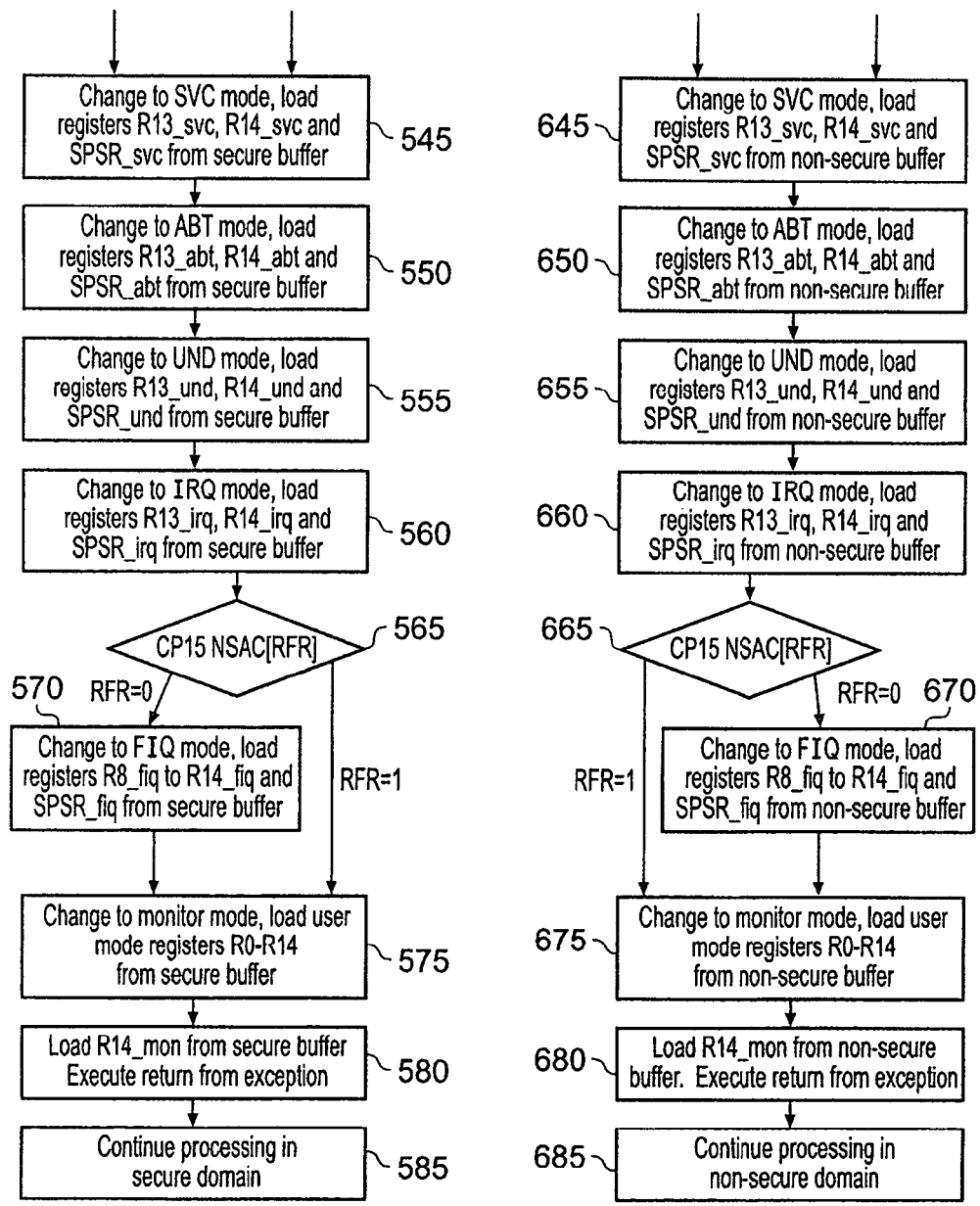
FIG. 8 is a flow diagram illustrating how the contents of the various registers are swapped during transition from one domain to another domain in accordance with a first embodiment of the present invention.

FIG. 8 illustrates the process performed in accordance with the first embodiment of the invention in order to execute the switch operation within monitor mode to change from one domain to another domain. On entering the monitor mode, it is determined at step 500 with reference to an NS field of the SCR register whether the core is currently in the non-secure domain or the secure domain. If in the non-secure domain, then at step 505 the contents of the register R14_mon (which stores the current PC value) is saved to a non-secure buffer in memory. Thereafter, at steps 510, 515, 520, 525 and 530, the user mode registers and the various mode specific registers associated with the IRQ, undefined, abort and supervisor modes are also stored to the non-secure buffer (with the appropriate mode changes taking place as required to access those mode specific registers). Thereafter, at step 535, it is determined whether the RFR bit in the access control register 92 is set. If not, then at step 540, the process transitions to the FIQ mode, and the FIQ mode specific registers are also stored to the non-secure buffer. However, if the RFR bit is set, then the process proceeds directly to step 545, rather than proceeding to step 545 via the earlier-mentioned step 540.

At steps 545, 550, 555 and 560, the processor switches to the relevant privileged modes and loads data values from a secure buffer into the mode specific registers associated with the supervisor, abort, undefined and IRQ modes. Thereafter, at step 565, it is determined if the RFR bit is set, and, if not, at step 570, the processor also changes to the FIQ mode and loads data values from the secure buffer into the FIQ mode specific registers. Thereafter, the process proceeds to step 575, or proceeds directly to step 575 if at step 565 it is determined that the RFR bit is set. At step 575, the processor changes back to monitor mode and loads the user mode registers from the secure buffer, and thereafter at step 580 loads the R14_mon register contents from the secure buffer. Thereafter, the processor proceeds to step 585 where processing then continues in the secure domain.

Steps 605 to 685 on the right hand side of FIG. 8 are analogous to the earlier-described steps 505 to 585 on the left hand side of FIG. 8, but illustrate the steps performed when transitioning from the secure domain to the non-secure domain. In both the left hand side of FIG. 8 and the right hand side of FIG. 8, it will be seen that if the RFR bit is set then there is no need to either save the contents of the FIQ specific registers to a buffer or load new values from a buffer into the FIQ mode specific registers when performing the context switch operation. Accordingly, this can significantly improve the speed of operation of the context switch operation as illustrated in FIG. 8.

Figure 9:
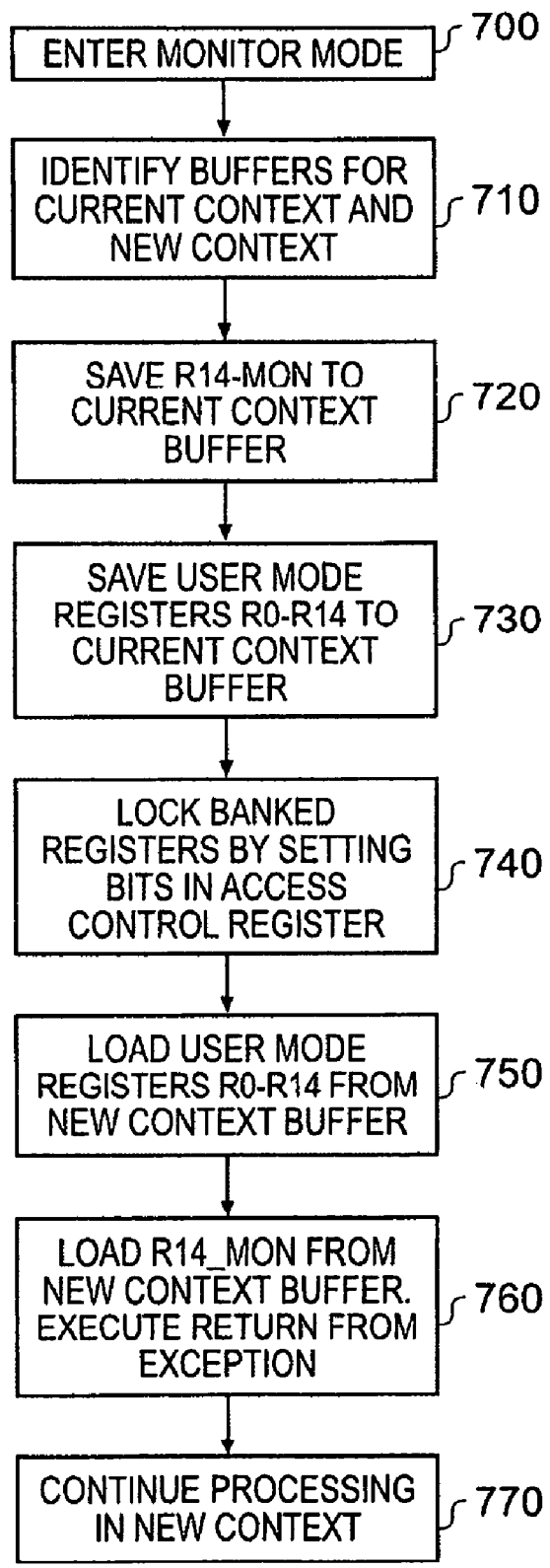
FIG. 9 is a flow diagram illustrating how the contents of the various registers are swapped when transitioning from one context to another context in accordance with a second embodiment of the present invention.

FIG. 9 is a flow diagram illustrating the steps required to implement the switch operation within the monitor mode when implementing the second embodiment of the present invention as discussed earlier with reference to FIG. 2B. As discussed earlier when describing FIG. 6, in such embodiments the monitor mode may be the earlier-described monitor mode discussed in the context of a system having a secure domain and a non-secure domain, or may more generically be a reference to the code used to perform a context switch operation, for example the code implementing the hypervisor layer 300 discussed earlier with reference to FIG. 6. At step 700, on identifying that a context switch operation is required, the monitor mode is entered. Thereafter, at step 710, buffers are identified for the current context and for the new context. Thereafter, at step 720, the register storing the current PC value is saved to the current context buffer, and then at step 730 the user mode registers are also saved to the current context buffer.

Thereafter, at step 740, the banked mode specific registers are locked by setting bits in the access control register. In particular, as discussed earlier with reference to FIG. 2B, this involves setting fields in the access control register associated with the supervisor mode specific registers 100, the abort mode specific registers 110, the Undefined mode specific registers 120, the IRQ mode specific registers 130 and the FIQ mode specific registers 140. In the embodiment discussed earlier with reference to FIG. 2, there is no need to lock the monitor mode specific registers 150, since they are permanently locked so that they can only be accessed by the monitor mode.

Thereafter, at step 750, the user mode specific registers are loaded with data obtained from the new context buffer, whereafter at step 760 the PC value associated with the new context is loaded into the R14_MON register. Thereafter, the processor executes a return from the exception, and then at step 770 continues processing in the new context.

As a result of the process illustrated schematically in FIG. 9, it will be appreciated that none of the contents of the banked registers are saved or loaded during the context switch operation, which can very significantly increase the speed of operation of the context switch operation.

However, whilst this significantly increases the speed of the context switch operation, it is likely that in the new context the processor will at some point wish to enter one of the privileged modes and access the associated mode specific registers. In accordance with one embodiment of the present invention, such an action is arranged to give rise to an exception, and in one particular embodiment, such an exception causes monitor mode code to perform an access control operation as will be described in more detail with reference to FIG. 10.

At step 800, an exception occurs on an attempt to access mode X registers in a locked bank, where mode X is one of the privileged modes whose associated mode specific registers have been locked. Thereafter, at step 810, the monitor mode is entered, whereafter at step 820 it is determined whether the mode X registers in the locked bank belong to the current context. Accordingly, considering the example where the system operates in a secure domain and a non-secure domain and each context is associated with one of those domains, then it is determined whether the mode X registers in the locked bank store data values that are associated with the current domain. If so, then the process proceeds directly to step 850, where the relevant control bit in the access control register is cleared. However, if it is determined at step 820 that the mode X registers in the locked bank do not belong to the current context then at step 830 the current data values in the mode X registers are saved to the relevant buffer. Thereafter, at step 840, the required contents for the mode X registers are loaded from the relevant buffer. By way of illustration, if the processor core is currently executing in the secure domain, and at step 820 it is determined that the contents of mode X registers pertain to the non-secure domain, then at step 830 the current contents of the mode X registers are saved to the buffer associated with the non-secure domain, and then at step 840 the contents of the mode X registers are updated by loading appropriate data values from the buffer associated with the secure domain.

Thereafter, at step 850 the relevant control bit in the access control register is cleared. Following clearing of the control bit at step 850, the process proceeds to step 860, where processing returns to the previous mode of operation, and normal processing resumes.

Figure 10:
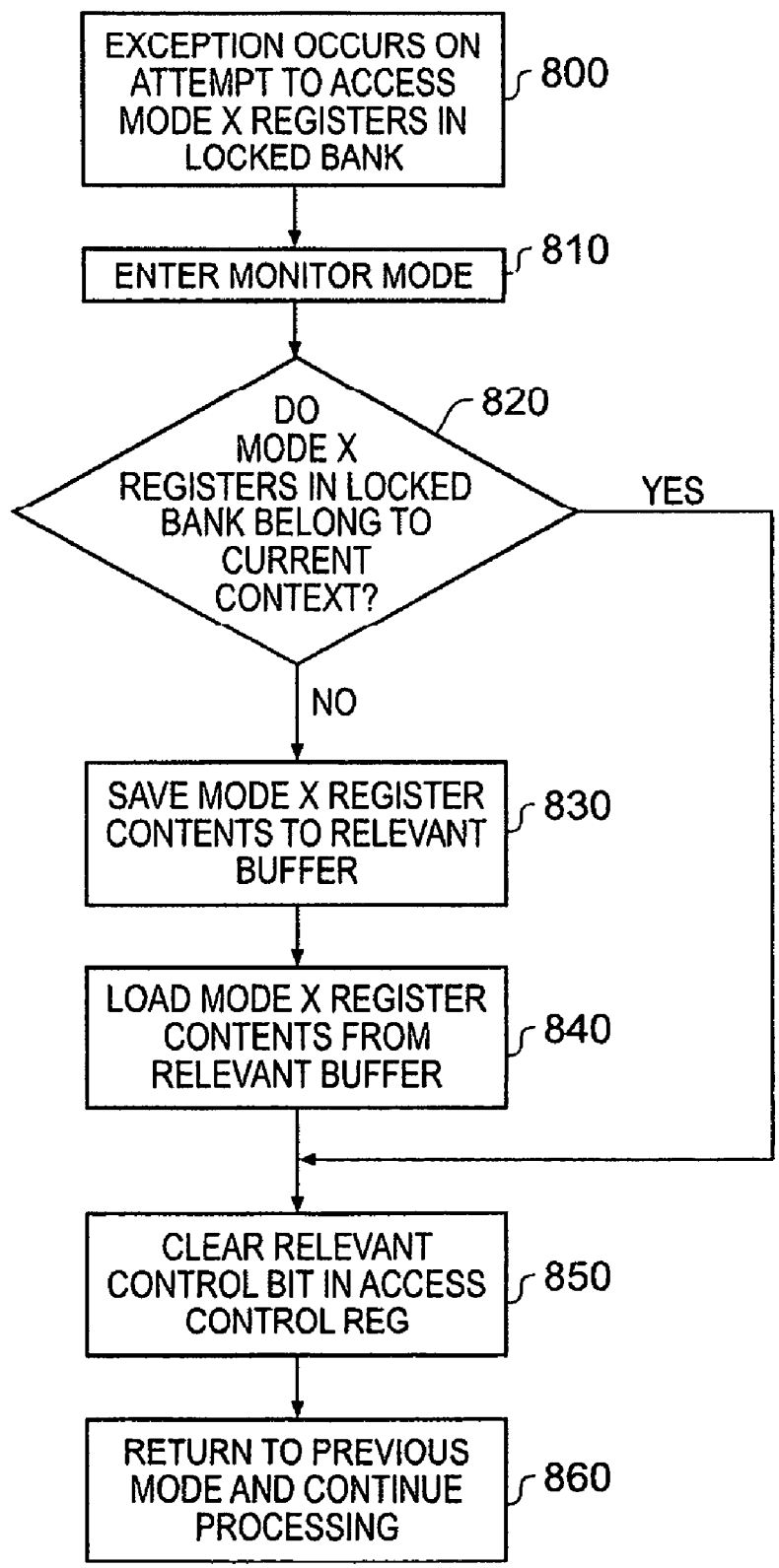
FIG. 10 is a flow diagram illustrating the process performed when an access to a mode specific register is attempted following a context switch in accordance with the second embodiment of the present invention.
Figure 11:
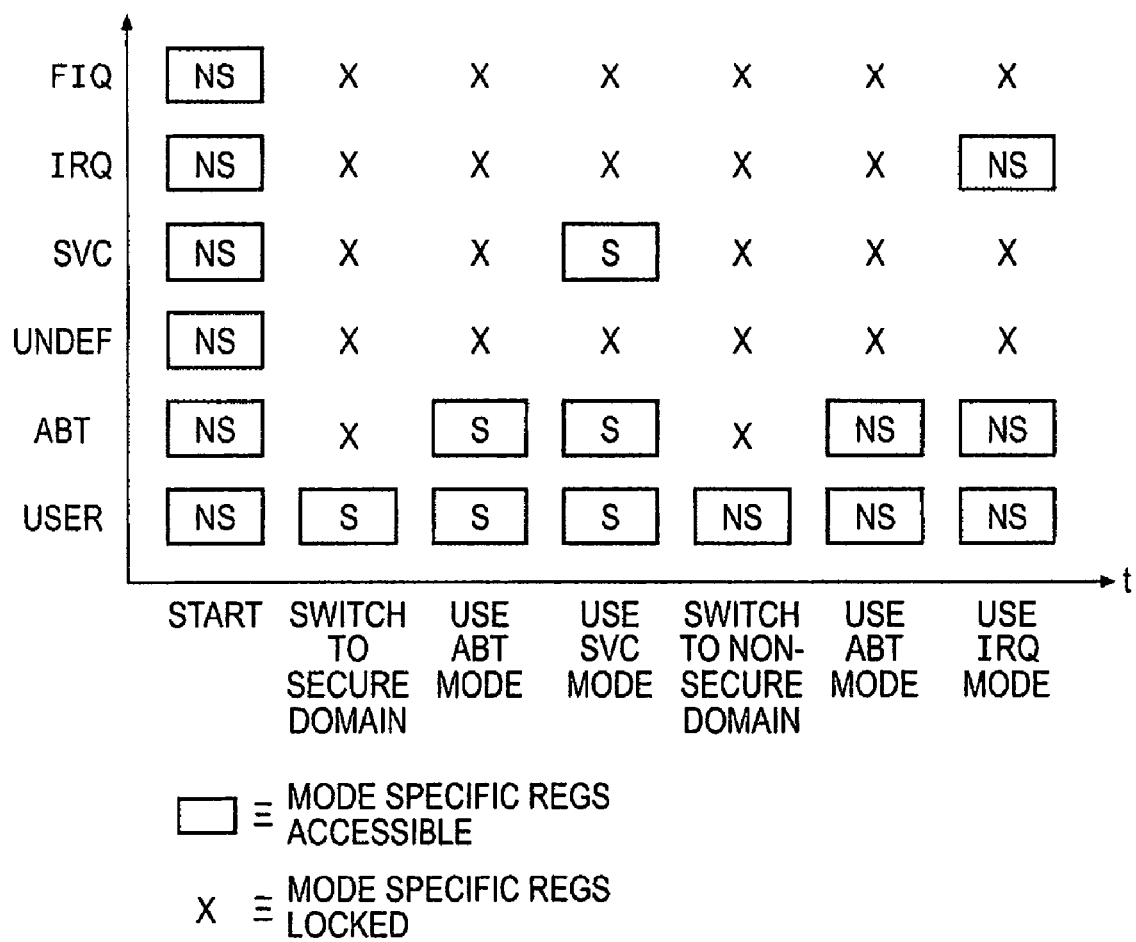
FIG. 11 is a diagram schematically illustrating the manner in which the various mode specific registers are managed in accordance with the second embodiment of the present invention.

FIG. 11 is a diagram schematically illustrating how the process described earlier in FIGS. 9 and 10 would operate in a system where the processor can operate in a secure domain or a non-secure domain. At start time, it is assumed that the processor core is executing in the non-secure domain, and the user mode general registers 22 contain data values pertaining to the non-secure domain, as do each of the banked registers 100, 110, 120, 130 and 140 associated with the supervisor, abort, undefined, IRQ and FIQ modes of operation. Thereafter, the process of FIG. 9 is used to switch to the secure domain, and immediately following such a switch, the user mode registers contain data pertaining to the secure domain, and each of the banked registers are locked, as indicated by the "X" in FIG. 11. When subsequently software executing in the secure domain transitions to the abort mode and attempts to access the abort mode specific registers, then the process of FIG. 10 is performed, and at step 820 it is determined that the abort mode specific registers do not contain data pertaining to the current domain. As a result, the contents of the abort mode specific registers are updated by performing steps 830, 840 of FIG. 10 and thereafter the control bit in the access control register associated with the abort mode is cleared. The same process is then repeated when subsequently the software executing in the secure domain enters the supervisor mode and attempts to access the supervisor mode specific registers.

Thereafter, as shown in FIG. 11, the processor switches to the non-secure domain, as a result of which the user mode registers are updated to contain data pertaining to the non-secure domain, and all of the mode specific registers are locked. Thereafter, if the non-secure software enters the abort mode, then the earlier described process is again repeated in order to update the abort mode specific registers to contain non-secure data. However, if then subsequently the non-secure software enters the IRQ mode, then when the process of FIG. 10 is invoked, it will be determined at step 820 that the IRQ mode specific registers do contain the data pertaining to the non-secure domain. Accordingly, steps 830 and 840 are not needed and instead the process proceeds directly to step 850 where the relevant control bit in the access control register is cleared as a result of which the non-secure IRQ mode software now has access to the data in the IRQ mode specific registers.

From the above description of embodiments of the present invention, it will be appreciated that through the provision of a control register which, for at least one mode of operation having at least one mode specific register associated therewith, has an access field which is programmable by the processing unit when operating in a predetermined mode of operation, this provides a mechanism by which the processing logic can selectively be denied access to such mode specific registers, thereby avoiding the need to update those registers when performing a switch operation between a current context and a new context. In one embodiment, when the access field is set, processing logic is denied access to any associated mode specific registers if the current context is a predetermined context, in one particular embodiment a context associated with a non-secure domain. In such embodiments, the content of those mode specific registers do not need to be updated when switching from or to the non-secure domain. In an alternative embodiment, any access fields associated with mode specific registers are set as part of the switch operation, as a result of which the processing logic is unconditionally denied access to those mode specific registers following the switch operation. This avoids updating any of the mode specific registers during the switch operation, and instead an exception handling routine is used to selectively update and allow access to mode specific registers as and when required subsequent to the switch operation. Both of the above described techniques significantly reduce the time required to perform the switch operation, thereby significantly improving the speed of operation of the system.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
a processing unit for performing data processing operations on data values, the processing unit having a plurality of modes of operation;
a plurality of registers for storing data values for access by the processing unit when performing said data processing operations, a subset of said registers being mode specific registers, each mode specific register being for use by the processing unit when operating in an associated mode of operation;

the processing unit further being switchable between a plurality of contexts, the data values stored in said plurality of registers being dependent on a current context of the processing unit, the processing unit being operable to perform a switch operation to switch from the current context to a new context during which the data values in said plurality of registers are updated having regard to the new context;

wherein the data processing apparatus includes a plurality of domains in which devices of the data processing apparatus operate, said plurality of domains comprising a secure domain and a non-secure domain, where in the secure domain the processing unit has access to secure data not accessible in the non-secure domain, and each of said plurality of contexts is associated with one of those domains a control register which, for at least one mode of operation having at least one mode specific register associated therewith, has an access field which is programmable by the processing unit when operating in a predetermined mode of operation, when the access field is set the processing unit being denied access to said associated at least one mode specific register if the current context is at least one predetermined context associated with the non-secure domain, whereby updating of the data values in said associated at least one mode specific register is avoided during said switch operation if either the current context or the new context is said at least one predetermined context.

2. A data processing apparatus as claimed in claim 1, wherein said plurality of modes include at least a first interrupt mode and a second interrupt mode, and the access field of the control register is associated with at least one mode specific register of the first interrupt mode, whereby when the access field is set the processing unit is denied access to said associated at least one mode specific register of the first interrupt mode if the current context is said at least one predetermined context.

3. A data processing apparatus as claimed in claim 2, wherein the data processing apparatus has a secure domain and a non-secure domain in which devices of the data processing apparatus can operate, and each of said plurality of contexts is associated with one of those domains, the processing unit being operable to process in the secure domain interrupts issued to the processing unit that are associated with the first interrupt mode and being operable to process in the non-secure domain interrupts issued to the processing unit that are associated with the second interrupt mode.

4. A data processing apparatus as claimed in claim 1, wherein when the access field is set the processing unit is unconditionally denied access to said associated at least one mode specific register following said switch operation, whereby updating of the data values in said associated at least one mode specific register is avoided during said switch operation.

5. A data processing apparatus as claimed in claim 4, wherein multiple of said plurality of modes of operation each have at least one mode specific register associated therewith, the control register providing an access field for each of said multiple modes of operation, during the switch operation the access fields being set by the predetermined mode of operation, whereby updating of the data values in the mode specific registers associated with the multiple modes of operation is avoided during said switch operation.

6. A data processing apparatus as claimed in claim 4, wherein if following the switch operation the processing unit in the new context requests access to a mode specific register whose associated access field is set, an exception is generated.

7. A data processing apparatus as claimed in claim 6, wherein if following the switch operation the processing unit in the new context requests access to a mode specific register whose associated access field is set, the processing unit is operable in response to the generated exception to perform an access control operation:
to determine if the data values currently stored in the at least one mode specific register of the mode of operation with which the mode specific register being accessed is associated belong to the new context;
if not, to update the data values in the at least one mode specific register of that mode of operation having regard to the new context and clear the associated access field;
if so, to clear the associated access field.

8. A data processing apparatus as claimed in claim 7, wherein said predetermined mode of operation in which the access field is programmable is a monitor mode, and the access control operation is performed by the processing unit when in said monitor mode.

9. A data processing apparatus as claimed in claim 4, wherein the data processing apparatus has a plurality of domains in which devices of the data processing apparatus can operate, and each of said plurality of contexts is associated with one of those domains.

10. A data processing apparatus as claimed in claim 4, wherein each of said contexts is associated with a virtual machine run on the processing unit.

11. A data processing apparatus as claimed in claim 1, wherein the plurality of registers comprise multiple banks of registers, and for each mode of operation having mode specific registers, those mode specific registers are provided in a separate bank.

12. A data processing apparatus as claimed in claim 1, wherein said predetermined mode of operation in which the access field is programmable is a monitor mode, and the switch operation is performed by the processing unit when in said monitor mode.

13. A data processing apparatus comprising:
processing means for performing data processing operations on data values, the processing means having a plurality of modes of operation;
a plurality of register means for storing data values for access by the processing means when performing said data processing operations, a subset of said register means being mode specific register means, each mode specific register means being for use by the processing means when operating in an associated mode of operation;
the processing means further being switchable between a plurality of contexts, the data values stored in said plurality of register means being dependent on a current context of the processing means, the processing means for performing a switch operation to switch from the current context to a new context during which the data values in said plurality of register means are updated having regard to the new context;
wherein the data processing apparatus includes a plurality of domains in which devices of the data processing apparatus operate, said plurality of domains comprising a secure domain and a non-secure domain, where in the secure domain the processing unit has access to secure data not accessible in the non-secure domain, and each of said plurality of contexts is associated with one of those domains a control register means which, for at least one mode of operation having at least one mode specific register means associated therewith, has an access field which is programmable by the processing means when operating in a predetermined mode of operation, when the access field is set the processing means being denied access to said associated at least one mode specific register means if the current context is at least one predetermined context associated with the non-secure domain, whereby updating of the data values in said associated at least one mode specific register means is avoided during said switch operation if either the current context or the new context is said at least one predetermined context.

14. A method of controlling access to registers in a data processing apparatus having a processing unit for performing data processing operations on data values, the processing unit having a plurality of modes of operation, and a plurality of registers for storing data values for access by the processing unit when performing said data processing operations, a subset of said registers being mode specific registers, each mode specific register being for use by the processing unit when operating in an associated mode of operation, the processing unit further being switchable between a plurality of contexts, the data values stored in said plurality of registers being dependent on a current context of the processing unit and wherein the data processing apparatus includes a plurality of domains in which devices of the data processing apparatus operate, said plurality of domains comprising a secure domain and a non-secure domain, where in the secure domain the processing unit has access to secure data not accessible in the non-secure domain, and each of said plurality of contexts is associated with one of those domains, the method comprising the steps of:

performing a switch operation to switch from the current context to a new context during which the data values in said plurality of registers are updated having regard to the new context;

for at least one mode of operation having at least one mode specific register associated therewith, programming an associated access field of a control register, such programming being performed by the processing unit when operating in a predetermined mode of operation;

when the access field is set, denying the processing unit access to said associated at least one mode specific register if the current context is at least one predetermined context associated with the non-secure domain; and when the access field is set, not updating the data values in said associated at least one mode specific register during said switch operation if either the current context or the new context is said at least one predetermined context.

* * * * *